Patented Aug. 30, 1932

1,874,258

UNITED STATES PATENT OFFICE

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN

STABILIZED HEATING FLUID AND METHOD OF STABILIZING SAME

No Drawing. Application filed July 13, 1929. Serial No. 378,182.

The present invention is concerned with heating fluids for high temperature work such as used for indirect heating, power cycles and the like. It is concerned specifically with a stabilized form of diphenyl oxide and a method for stabilizing diphenyl oxide.

The advantages arising from the use of a high point stable fluid as heating agent employing either the heated fluid or the vapor thereof has been recently appreciated and considerable effort has been directed to developing methods of advantageously employing such fluids.

Prominent among fluids proposed and in connection with which research of considerable extent has been accomplished, is diphenyl oxide having an atmospheric boiling point approximating 500° F., and being fairly stable up to a temperature of 725° F. Diphenyl oxide has ideal properties for use as vapor in a heating or power cycle or for use in the heated liquid form as a heating agent, and in indirect heating generally and in power cycles. It has been found, however, that some decomposition occurs during prolonged heating, particularly at temperatures above 725° F. It has been further found that upon continuing the heating the rate of decomposition, as evidenced by the change in atmospheric boiling point, falls off becoming less and less, and I have found that such falling off in the rate of decomposition is caused by a stabilization of the diphenyl oxide by the accumulation therein of a certain product of decomposition, namely, diphenylene oxide. This latter substance has a boiling point approximating 640° F. and has been found in the pure form to be stable up to a temperature of 1022° F. Other decomposition products arising from the decomposition of diphenyl oxide are phenol and benzene.

The decomposition of diphenyl oxide upon prolonged heating at high temperatures introduces a disadvantageous factor into its use as a heating fluid for which it is in all other respects most admirably suited and the overcoming of such decomposition tendency is a highly desirable end.

To the accomplishment of the foregoing and related ends, the invention, then, consists of the composition and method hereinafter fully described and particularly pointed out in the claims, the following description setting forth in detail several modes of carrying out the invention, such disclosed modes illustrating, however, but several of various ways in which the principle of the invention may be used.

My invention consists in adding initially to the diphenyl oxide a quantity of diphenylene oxide, the quantity so added being in the approximate proportion that would eventually be formed during prolonged use of such diphenyl oxide in the particular apparatus or heating cycle for which it is intended. The presence of such diphenylene oxide in the mixture so formed with diphenyl oxide acts by mass action to push the equilibrium in the decomposition reaction toward the diphenyl oxide side thereof, thereby eliminating or substantially restricting the formation of diphenylene oxide by decomposition of the diphenyl oxide. I find further that, for most purposes employing temperatures of the so prepared mixture in the range 600° F. to 800° F., a mixture of diphenyl oxide and diphenylene oxide in the ratio of 70 to 30 parts by weight will insure the practically complete stabilization of the diphenyl oxide.

When a diphenylene-oxide diphenyl-oxide mixture is boiled in the conventional drum type boiler, it is obvious that the vapor composition will differ from the residual liquid composition, and it is also obvious that, depending upon the ratio of the residual liquid volume to the vapor volume, such change in composition may proceed to greater or less extent. If a large portion of the mixture is present in the system as vapor, the residual unvaporized liquid will become markedly concentrated as to diphenylene oxide content. If the proportion of the mixture in the vapor form in the system is small such concentration will be less marked.

It will accordingly be desirable to adjust the ratio of diphenylene oxide added to the diphenyl oxide to compensate for the volume ratio conditions in the system in which the mixture is employed.

The stabilizing action of diphenylene oxide may be also applied to mixtures of diphenyl oxide with other substances desirably added thereto to affect advantageously its boiling point or freezing point, such for instance, as diphenyl, naphthalene, etc. The stabilizing action will be secured by adding to such mixture diphenylene oxide, which will exert in the mixture the described stabilizing action of the diphenyl oxide component thereof.

Other modes of applying the principle of my invention may be employed instead of the one explained, change being made as regards the materials or steps employed, provided the ingredients or steps stated by any of the following claims or the equivalent of such stated ingredients or steps be employed.

I therefore particularly point out and distinctly claim as my invention:—

1. A stabilized heating fluid containing diphenyl oxide to which has been added diphenylene oxide.

2. A stabilized heating fluid comprising diphenyl oxide to which has been added diphenylene oxide in the approximate ratio of 70 parts of diphenyl oxide to 30 parts by weight of diphenylene oxide.

3. The method of stabilizing diphenyl oxide at high temperatures which consists in adding thereto diphenylene oxide.

4. The method of stabilizing diphenyl oxide against decomposition at high temperatures which consists in adding thereto diphenylene oxide.

5. The method of stabilizing diphenyl oxide at high temperatures which consists in adding to the diphenyl oxide, diphenylene oxide in the ratio of 30 or less parts of diphenylene oxide in a hundred parts of the resulting mixture.

6. A composition of matter comprising diphenyl oxide to which has been added diphenylene oxide.

7. A composition of matter consisting of diphenyl oxide to which has been added approximately thirty per cent by weight of diphenylene oxide.

8. A composition of matter consisting of a mixture of diphenyl oxide, diphenylene oxide and diphenyl.

9. A composition of matter consisting of a mixture of diphenyl oxide, diphenylene oxide and naphthalene.

Signed by me this 10th day of July, 1929.

HERBERT H. DOW.